United States Patent
Keller et al.

(10) Patent No.: US 9,928,324 B1
(45) Date of Patent: Mar. 27, 2018

(54) SYSTEM AND METHOD FOR ACCURATE MODELING OF BACK-MILLER EFFECT IN TIMING ANALYSIS OF DIGITAL CIRCUITS

(71) Applicant: Cadence Design Systems, Inc., San Jose, CA (US)

(72) Inventors: Igor Keller, Pleasanton, CA (US); William Franson Scott, Sunnyvale, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 976 days.

(21) Appl. No.: 14/264,695

(22) Filed: Apr. 29, 2014

(51) Int. Cl.
  *G06F 17/50* (2006.01)
(52) U.S. Cl.
  CPC ...... *G06F 17/5036* (2013.01); *G06F 17/5022* (2013.01); *G06F 2217/84* (2013.01)
(58) Field of Classification Search
  CPC .............. G06F 17/5036; G06F 17/5022; G06F 2217/84
  See application file for complete search history.

(56) References Cited

U.S. PATENT DOCUMENTS

| | | | | |
|---|---|---|---|---|
| 7,299,445 | B2* | 11/2007 | Levy | G06F 17/5036 703/16 |
| 7,359,843 | B1 | 4/2008 | Keller et al. | |
| 7,464,349 | B1 | 12/2008 | Keller et al. | |
| 7,983,891 | B1 | 7/2011 | Keller | |
| 8,726,211 | B2* | 5/2014 | Phillips | G06F 17/5036 716/110 |
| 2002/0021135 | A1* | 2/2002 | Li | G06F 17/5022 324/677 |
| 2010/0269083 | A1* | 10/2010 | Sinha | G06F 17/5031 716/102 |
| 2012/0143582 | A1* | 6/2012 | Feldmann | G06F 17/5036 703/14 |

OTHER PUBLICATIONS

HSPICE® User Guide: Simulation and Analysis, Version B-2008.09, Synopsys, Sep. 2008.*
"ECSM Library Formal", http://www.cadence.com/Alliances/languages/Pages/ecsm.aspx, 2004, 2 pages.

* cited by examiner

*Primary Examiner* — Aniss Chad
(74) *Attorney, Agent, or Firm* — Andrews Kurth Kenyon LLP

(57) ABSTRACT

A system, method, and computer program product for modeling a receiver load in static timing analysis of digital circuits. Embodiments separate total receiver charge into static and dynamic components, and extract both from an improved library model. The receiver load is effectively modeled with a static capacitance and a current source connected in parallel. A method of extracting load model characteristics from a standard timing library is also provided. The improved receiver model reflects the physical phenomena not currently modeled, and enables a more accurate description of circuit behavior while still using a simple approximation of the transistor level circuit. The complete circuit switching response is found through a perturbative approach, combining a linear response using constant capacitance values with a correction having time-dependent charges for modeling physical phenomena such as the back-Miller effect. The result is improved circuit timing evaluation, with good accuracy versus SPICE simulation for waveforms and delays.

20 Claims, 9 Drawing Sheets

$$Cpin(k) = \frac{1}{x_k V_{dd}} \int_0^{x_k T_{in}} I_p dt, \ k = 1,2,3,...$$

SYSTEM AND METHOD FOR ACCURATE MODELING OF BACK-MILLER EFFECT IN TIMING ANALYSIS OF DIGITAL CIRCUITS

FIELD OF THE INVENTION

This patent application relates to the field of circuit simulation, and more specifically to enabling circuit designers to more easily and accurately incorporate the back-Miller effect into the timing analysis of digital circuits.

BACKGROUND

Modern circuit designs often comprise a number of circuit blocks that are characterized and then re-used many times. The successful re-use of component circuit blocks thus hinges on the designer's ability to accurately characterize their timing and functionality. Static Timing Analysis (STA) is a design tool used to verify the timing behavior of a digital circuit design during one clock cycle, without the need to simulate the circuit. Complete transistor-level simulation of a circuit design is often too computationally expensive to use at all stages of the circuit design process, so digital circuit behavior is typically approximated.

The STA process calculates the approximate delay between a circuit's inputs and outputs. Such delay is one of the figures of merit for a circuit. A rising or falling voltage transition may be abstracted by a timing event, to approximate an actual circuit voltage waveform using only two parameters, the arrival time and slew rate. The arrival time of the transition may be based on the time that the voltage waveform reaches a selected reference voltage or trip point, such as a particular percentage of the supply voltage for example. The slew rate is the maximum rate of voltage change, which in STA may be estimated from the time the waveform takes to move from one given voltage to a second given voltage, where again the given voltages may be expressed as particular percentages of the supply voltage.

In advanced semiconductor fabrication processes, with design features now regularly at or below sixteen nanometers, real circuit component behavior is not always sufficiently straightforward that such analysis approximations are adequate. The approximation of the actual circuit waveform provided by the STA timing event for example may be too imprecise to verify the design's timing correctness. Even simple circuit blocks may prove challenging to characterize accurately with existing static timing methods in some circumstances.

A conceptually simple equivalent circuit block to be approximately characterized for STA may comprise merely a driver that drives a receiver, generally via an interconnect network. Drivers and receivers may comprise a variety of components, such as logic gates and their combinations for example. The interconnect network may be described by a network of resistors and capacitors (an RC network) that mimics the interconnect network behavior in a computationally inexpensive manner, or by a look-up table that provides descriptive information without requiring detailed simulation. Interconnect modeling has become well developed in the art. Focus therefore shifts to the role of the receiver in timing estimation. The electrical load the receiver places on a driver has become a significant part of the overall electrical load seen by the driver, and merits further modeling attention.

The receiver input capacitance becomes larger as a fraction of the total capacitance driven by a driver as design features are reduced in size. The electrical behavior of the receiver input capacitance also becomes less static and more dynamic at smaller geometries, meaning the time dependence and voltage dependence of the receiver becomes more complicated. The resulting nonlinear receiver capacitance is a leading cause of the resulting waveform anomalies that dominate delay calculation errors. Circuit timing analysis and verification accuracy therefore increasingly depend on the receiver load modeling accuracy.

The receiver load was traditionally modeled by a single "pin" capacitance obtained from a pre-characterized library. Prior art methods of adapting such capacitance models for more accuracy exist. One such method involves approximating the capacitance with an average value of a weighted sum of three individual values, with the weights found experimentally. The resulting transition time is then scaled by a "slew factor" computed from capacitance values at different voltage transition levels. This prior art method is simple and computationally fast, but is still inaccurate in some cases, and cannot capture physical phenomena well.

There are several important physical phenomena that are not currently well-modeled in digital circuit timing analysis, and more particularly in modeling receiver loads. One such phenomenon is the resistive shielding of the transistor gate capacitances, which results from the use of polysilicon transistor gates and contacts in advanced fabrication processes. Another phenomenon is the back-Miller effect, which is caused by coupling capacitance between a receiver's input and the first receiver output stage, particularly when the first receiver output stage is actively switching states. These effects tend to cause significant waveform anomalies that are not currently predicted accurately. As a result of the inadequacy of prior receiver load modeling efforts, the delays, transition rates, and other electrical measurements estimated by circuit timing tools may include significant errors.

The inventors have therefore developed an improved approach to more accurately modeling receiver loads in a circuit design, particularly for timing analysis of digital circuits.

DETAILED DESCRIPTION

This description presents a new system, method, and computer program product for more accurate modeling of receiver loads in timing analysis of digital circuits. Embodiments may separate total receiver charge into static and dynamic components, and extract both from an improved library model. The receiver load is effectively modeled with a static capacitance and a current source connected in parallel. A method of extracting load model characteristics from a standard timing library is also provided. The improved model may reflect physical phenomena not currently modeled, and enables a more accurate description of circuit behavior while still using a simple approximation of the transistor level circuit. The complete circuit switching response is found through a perturbative approach, combining a linear response using constant capacitance values with a correction having time-dependent charges for modeling physical phenomena such as the back-Miller effect. The result is improved circuit timing evaluation, with good accuracy versus SPICE simulation for waveforms and delays.

Figure 1:
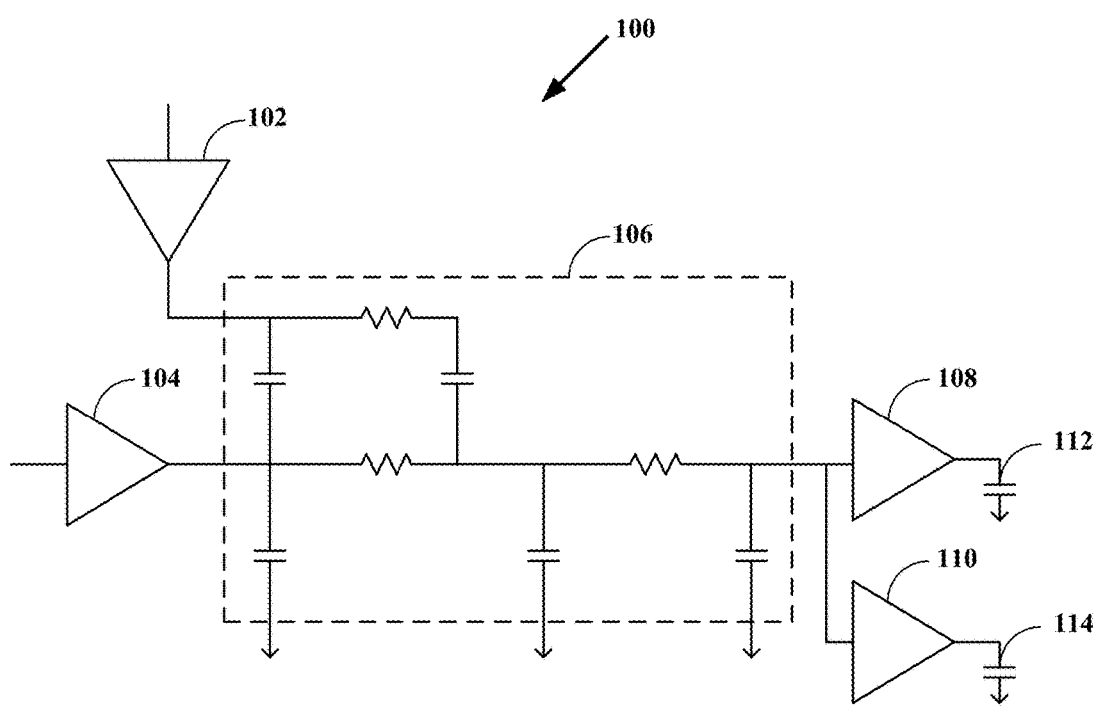
FIG. 1 is a diagram of a circuit block in static timing analysis, according to an embodiment.

FIG. 1 shows a circuit block 100 in static timing analysis, according to an embodiment. For simplicity, only two drivers 102 and 104, interconnect network 106, two receivers 108 and 110, and their two output loads 112 and 114 are shown. The circuit block may however represent a complete cell in a standard cell library for example in practice. The load that each receiver in the circuit block places on each driver may be modeled separately. Similarly, the influence of the various drivers may be incorporated into the static timing analysis separately.

A complete transistor-level simulation of circuit block 100 may be too time-consuming, yet conventional methods of modeling receiver loads may be too inaccurate. An analysis approach is therefore needed that provides more accurate receiver load modeling, including previously poorly modeled physical phenomena, without resorting to a full circuit simulation. Users may prefer an approach that uses widely available timing libraries.

A timing library is typically a two-dimensional table comprising for example values of rise time, fall time, fall transition time, and rise transition time for a particular component. A timing library may store data for different voltage values. For example, the well-known ECSM timing library format specifies data at three different voltage values. The data in the timing library may be generated based on a given output load capacitance and input signal slew rate, to derive a change in the component output voltage with respect to a change in the component input voltage.

Figure 2:
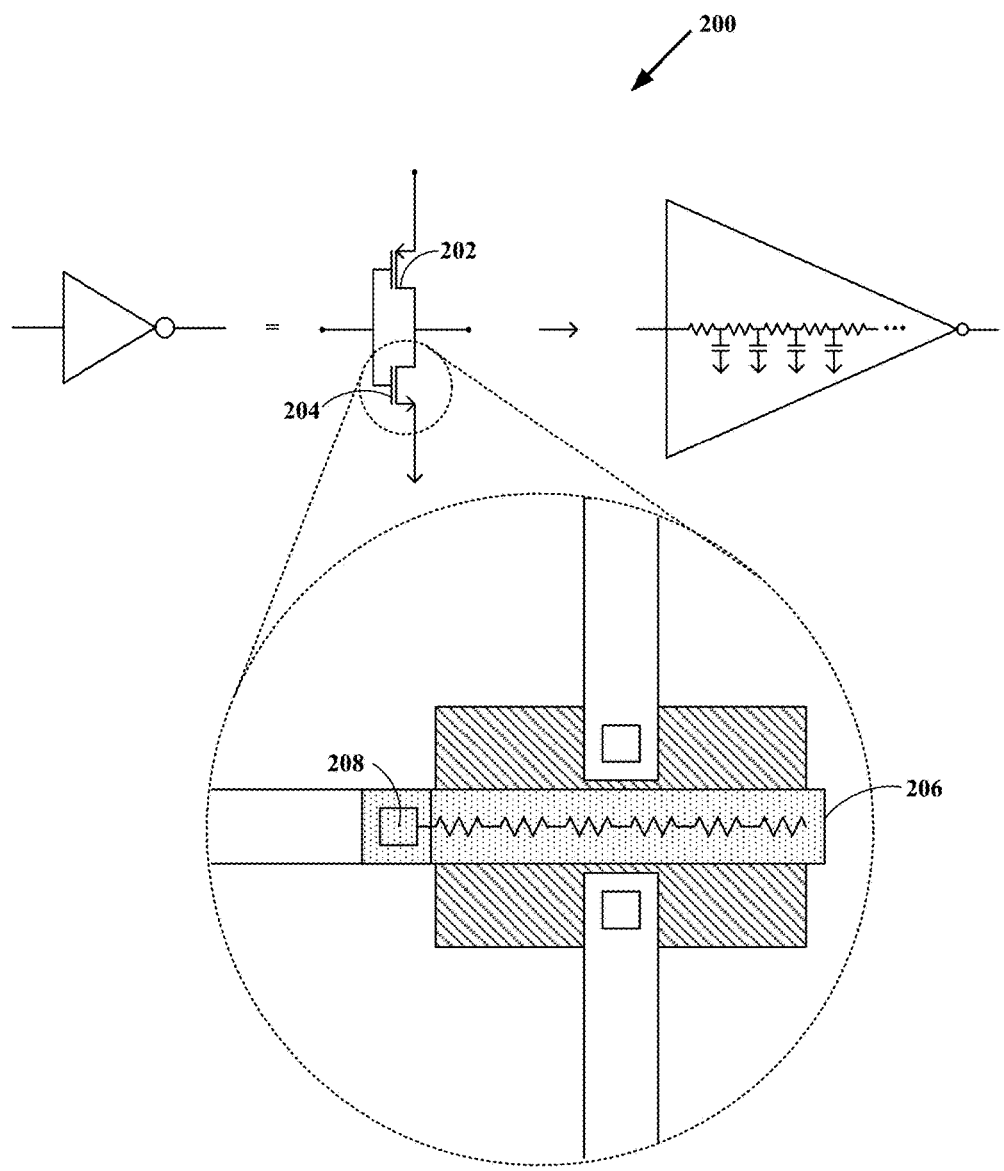
FIG. 2 is a diagram of a resistive shielding effect in a receiver, according to an embodiment.

FIG. 2 shows a resistive shielding effect in a receiver 200, according to an embodiment. In this case, the receiver may comprise an inverter, with for example two transistors 202 and 204 that change state depending on the applied input voltage. Resistive shielding refers to the fact that in some fabrication processes that use polysilicon transistor gates, there may be a significant resistance from the transistor gate contact to the far end of the transistor gate.

Different portions of a given transistor's gate conductor 206 may thus be at slightly different dynamic voltages during switching, depending on their respective distances from the transistor gate contact 208. Thus, the transistor may behave as a distributed set of individual devices, with portions far from the gate contact electrically separated from or shielded by other portions to some extent, due to the different overall gate conductor resistance applicable to each individual device. The various transistor gate capacitances may therefore be effectively charged by slightly different voltage distributions as well. This phenomenon is one source of receiver nonlinearity.

Figure 3:
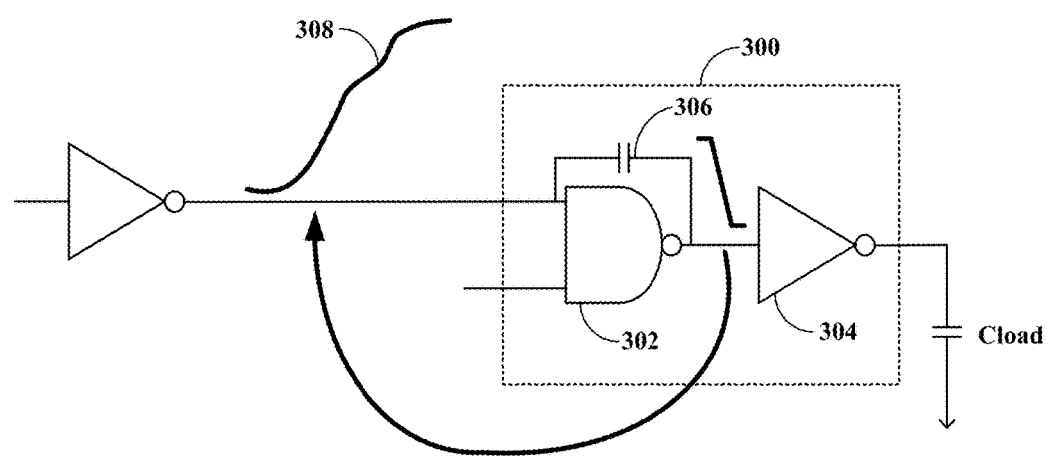
FIG. 3 is a diagram of a back-Miller effect in a receiver, according to an embodiment.

FIG. 3 shows a back-Miller effect in a receiver 300, according to an embodiment. The back-Miller effect is caused by coupling capacitance between a receiver's input and the output of the first receiver stage 302, particularly when the next receiver stage 304 is actively switching states. The next receiver stage 304 is an "aggressor" in timing analysis parlance, which may rapidly move charge to or from the coupling capacitance 306, which may cause a bump or plateau shaped waveform anomaly 308 in some situations, usually on the waveform tail as shown. This phenomenon is often difficult to capture and model successfully, especially with narrow slew thresholds (e.g., 0.3 Vdd to 0.7 Vdd). The propagation of such anomalies may result in significant errors in circuit timing estimations.

Today's timing cell models are inadequate for handling the back-Miller effect. Pin capacitance tables have little data to extract Miller capacitance, typically with data provided for only two or three voltage values. Further, the capacitance values are often characterized at narrow thresholds, with no data available below the slew threshold. For multi-stage receivers, it is thus difficult to determine when the first receiver stage output is switching. Simulation with multiple current sources at the various receiver stages is extremely computationally expensive.

Figure 4:
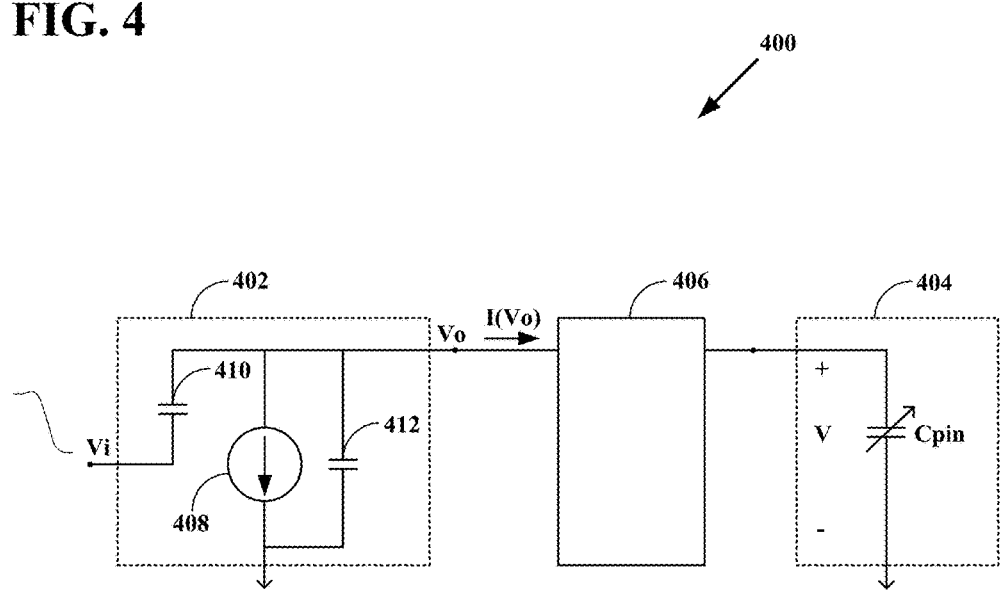
FIG. 4 is a diagram of a simulated circuit block, according to an embodiment.

FIG. 4 shows a simulated circuit block 400, according to an embodiment. This circuit block may comprise a single driver 402 and a single receiver represented by a single variable "pin" capacitance 404 as shown. The circuit block or subcircuit may be a minimized representation of a portion of a larger circuit, for purposes of better modeling of the load caused by the receiver upon the driver. An interconnect 406 between the driver and the receiver may also be included, and may be modeled with an RC network or look-up table model as may be known in the art. The driver 402 may be modeled as a current source 408 controlled by driver input voltage Vi and driver output voltage Vo, along with internal driver capacitances 410 and 412, as may be known in the art.

The embodiments of the present invention may provide a new approach to modeling nonlinear pin capacitance in delay calculation. Delay calculators compute voltage transitions. Embodiments of the present invention may perform a simulation on circuit block 400 to determine the effective receiver load behavior more accurately, so that behavior may be incorporated into delay calculations.

The embodiments may describe the receiver as comprising a static (non-voltage-dependent) capacitance term $C_p$ and a parallel current source $Q_M(t, V)$ that represents a varying charge storage term. This receiver load model thus separates the total charge going into the pin capacitance 404 into static and dynamic parts: $Q_p = C_p*V + Q_M(t, V)$. Both parts may be extracted from library data.

The static receiver pin capacitance $C_p$ is usually provided in a library model as a function of receiver input voltage, slew rate, and receiver output load. The RC reduction process used to describe the interconnect may use the static portion of the pin capacitance, $C_p$. The receiver input voltage waveform slew rate may be estimated at a particular time point, and used to extract a corresponding static capacitance value from the library model for a given receiver output load. The embodiments may also use static capacitance $C_p$ in the simulation of a nominal circuit response, using a SPICE-type simulator for example that solves ordinary differential equations through numerical integration, as is known in the art.

The embodiments may then find the $Q_M(t, V)$ perturbation or correction term, represented by the parallel current source, by using linear simulation based on the simulated nominal circuit response. This corrective term may be caused by nonlinear capacitance and physical phenomena such as the back-Miller effect. Finally, the resulting voltage correction may be computed and added to the previously simulated circuit voltage response to yield an accurate circuit response waveform.

Figure 5:
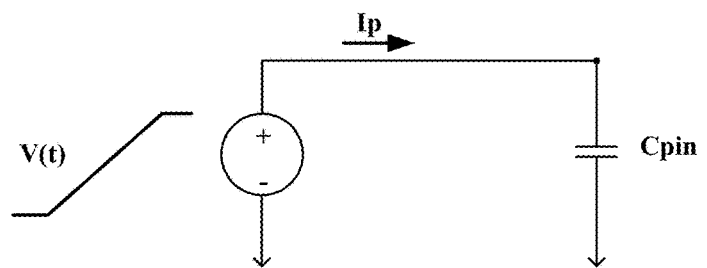
FIG. 5 is a diagram of pin capacitance characterization, according to an embodiment.

FIG. 5 shows pin capacitance 500 characterization, according to an embodiment. Pin capacitance may be generally modeled and characterized for a given cell using a timing library like the well-known ECSM library for example via the following process. First, a circuit simulator may simulate the cell's response to an input voltage ramp. Next, the circuit simulator may capture the current flowing through the input pin. The simulator may then integrate this current over predefined input voltage ranges. The process may then be repeated over further input waveform segments or arcs. The input waveform segments chosen may be optimized for accuracy. For higher accuracy, embodiments may use more values of pin capacitance than are provided in the widely-used ECSM library model, with its eight capacitance values currently being used as a standard.

The timing library may provide $Q_{total}$ ($V_k$) for example eight values of k. A linear fit of the low charge values (in the rising transition case) may determine $C_p$. The difference between Q(v) and $C_p*V$ is deemed the back-Miller capacitance. This gives a back-Miller capacitance function up to the last $V_k$.

For Q(Vdd), the embodiments may use a maximum value of Q($V_{last}$) over the library table, which is at large input slew rate and low effective capacitance value, allowing the receiver to switch completely. The embodiments may then convert the Q(v) function to Q(t) using the waveform from the nominal simulation, plus estimates of delay and slew of the receiver. These Q(t) functions may be used in the linearized pin capacitance correction computation as $Q_M$(t). Since the result of the correction computation will be to increase the slew, the embodiments anticipate this by increasing the slew rates used to look up Q(v) from the timing library. The embodiments may increase the slew rates by a multiplying factor depending on (total back-Miller capacitance)/(total capacitance).

In another embodiment, the dynamic pin charge for a receiver may be described by another model wherein $Q_M$(t, Vout)=$Q_D$(t)+cm*Vout, where dVout/dt=F(Vin,Vout), Vin is the input voltage applied to the receiver, and Vout is a dynamic variable. Here F may be a simple function extracted from the library data, e.g., linear, quadratic, or exponential. The term cm*Vout may contain most of the strong dynamic behavior that causes waveform anomalies in the full circuit simulation. Here $Q_D$(t) may be a fixed function of time that provides a relatively small correction, containing the portion of $Q_M$(t, Vout) that is more complex than the simple cm*Vout model term.

Figure 6:
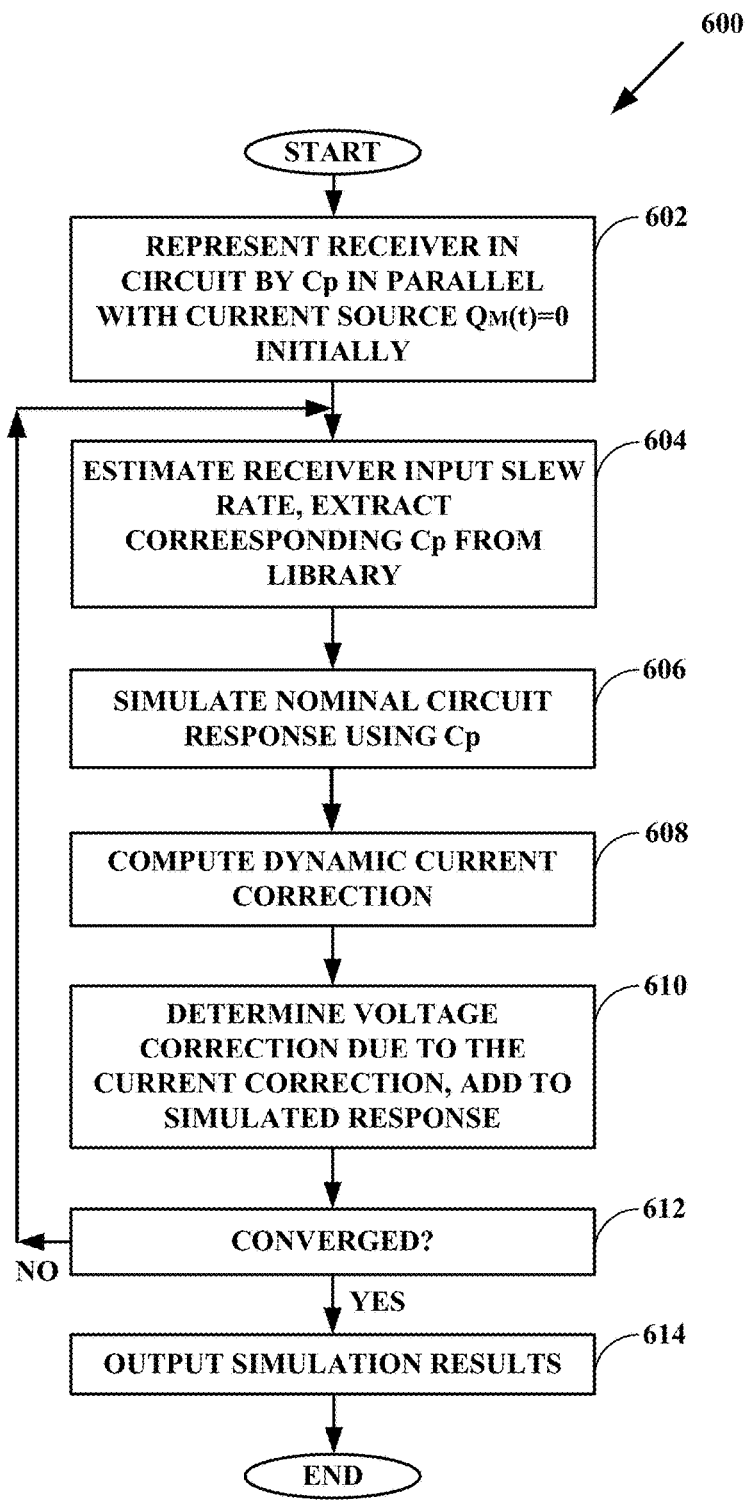
FIG. 6 is a flowchart of a receiver load modeling method, according to an embodiment.

FIG. 6 shows a flowchart 600 of a receiver load modeling method, according to an embodiment. Computing the complete circuit response in this method is an iterative process, because the receiver pin capacitance model depends on the input slew rate, which in turn depends on the pin capacitance because of its nonlinearity. The full circuit response computation thus comprises several steps that may be iterated until the simulation converges:

1. extracting the pin capacitance model parameters from the timing library using an estimated receiver slew rate.
2. simulating the nominal nonlinear circuit voltage response using an average capacitance value for the receiver.
3. computing the current correction caused by nonlinear capacitance and back-Miller effect.
4. determining the resulting voltage correction and adding it to the previously computed voltage response.

Referring now to the flowchart, at 602 the embodiment may first represent the receiver load in a simulated circuit, comprising a driver and a receiver, by a static capacitance $C_p$ in parallel with a current source that are each to be iteratively characterized from a timing library. The simulated circuit may also comprise an interconnect. At 604, the embodiment may estimate a receiver input waveform slew rate and extract a corresponding static capacitance value $C_p$ from the timing library.

At 606, the embodiment may simulate a nonlinear circuit voltage response by including the static capacitance value $C_p$ in the circuit. At 608, the embodiment may compute a linearized dynamic current correction represented by the current source. At 610, the embodiment may determine a voltage correction due to the current source and add the voltage correction to the simulated nonlinear circuit voltage response. At 612, the embodiment may evaluate circuit simulation convergence criteria to determine if the simulator has reached a self-consistent solution. If the convergence criteria are not met, the embodiment may return to 604 and continue the iterative characterization process.

At 614, when the convergence criteria are met, the embodiment may output the simulation results. The embodiment may also output the characterization results that properly describe the receiver load.

Figure 7:
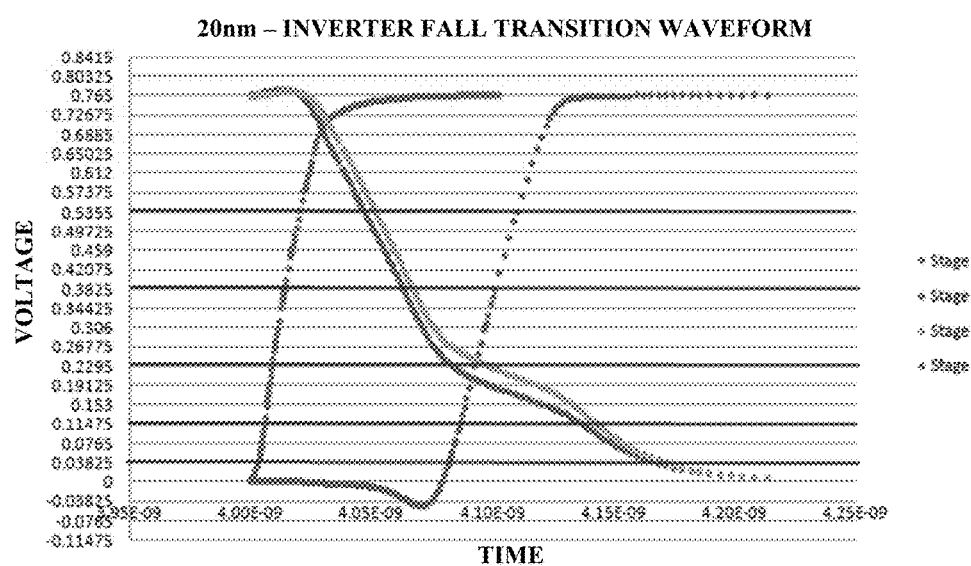
FIG. 7 is a flowchart of a measured and modeled circuit block transition voltage waveform, according to an embodiment.

FIG. 7 shows a measured and modeled circuit block transition voltage waveform 700, according to an embodiment. The new simulation approach is based on a physical model that is capable of providing a realistic waveform calculation. The embodiments may accurately model the bump or plateau anomaly on a waveform tail due to the back-Miller effect. The correctly simulated waveform and the characterized receiver model used to obtain it may be used in timing analysis.

Figure 8:
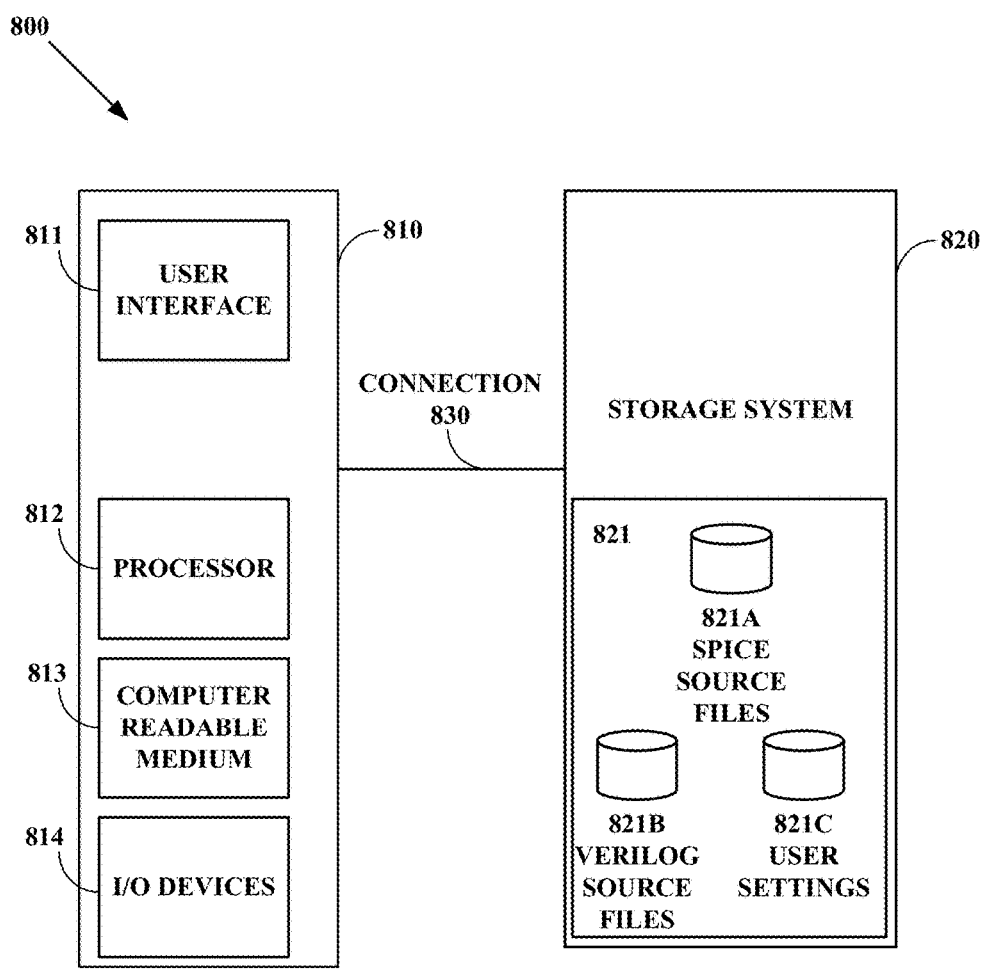
FIG. 8 is a block diagram of a circuit analysis system, according to an embodiment.

FIG. 8 shows a block diagram of an exemplary circuit analysis system 800, according to an embodiment. This system may provide simulator functionality for any of the methods described above. A user may access the system 800 through a standalone client system, client-server environment, or a network environment. System 800 may comprise one or more clients or servers 810, one or more storage systems 820, and a connection or connections 930 between and among these elements.

Client 810 may execute instructions stored on transitory or non-transitory computer readable medium 813 with processor 812, and may provide a user interface 811 to allow a user to access storage system 820. The instructions may be part of a software program or executable file that may operate electronic design automation (EDA) software. Client 810 may be any computing system, such as a personal computer, workstation, mobile computer, or other device employing a processor which is able to execute programming instructions. User interface 811 may be a GUI run in a user-controlled application window on a display. A user may interact with user interface 811 through one or more input/output (I/O) devices 814 such as a keyboard, a mouse, or a touch screen.

Storage system 820 may take any number of forms, including but not limited to a server with one or more storage devices attached to it, a storage area network, or one or a plurality of non-transitory computer readable media. Databases 821 may be stored in storage system 820 such that they may be persistent, retrieved, or edited by the user. Databases 821 may include SPICE source files 821A, Verilog source files 821B, and a user input database 821C for example. These databases may be kept as separate files or systems, or may be merged together in any appropriate combination.

Only one client 810 is shown connected to storage system 820 through connection 830, which may be a simple direct wired or wireless connection, a system bus, a network connection, or the like, to provide client 810 with access to storage system 820. In another aspect, connection 830 may enable multiple clients 810 to connect to storage system 820. The connection may be part of a local area network, a wide area network, or another type of network, again providing one or more clients with access to storage system 820. Depending on system administrator settings, client 810's access to system storage 820 or to other clients may be limited.

Figure 9:
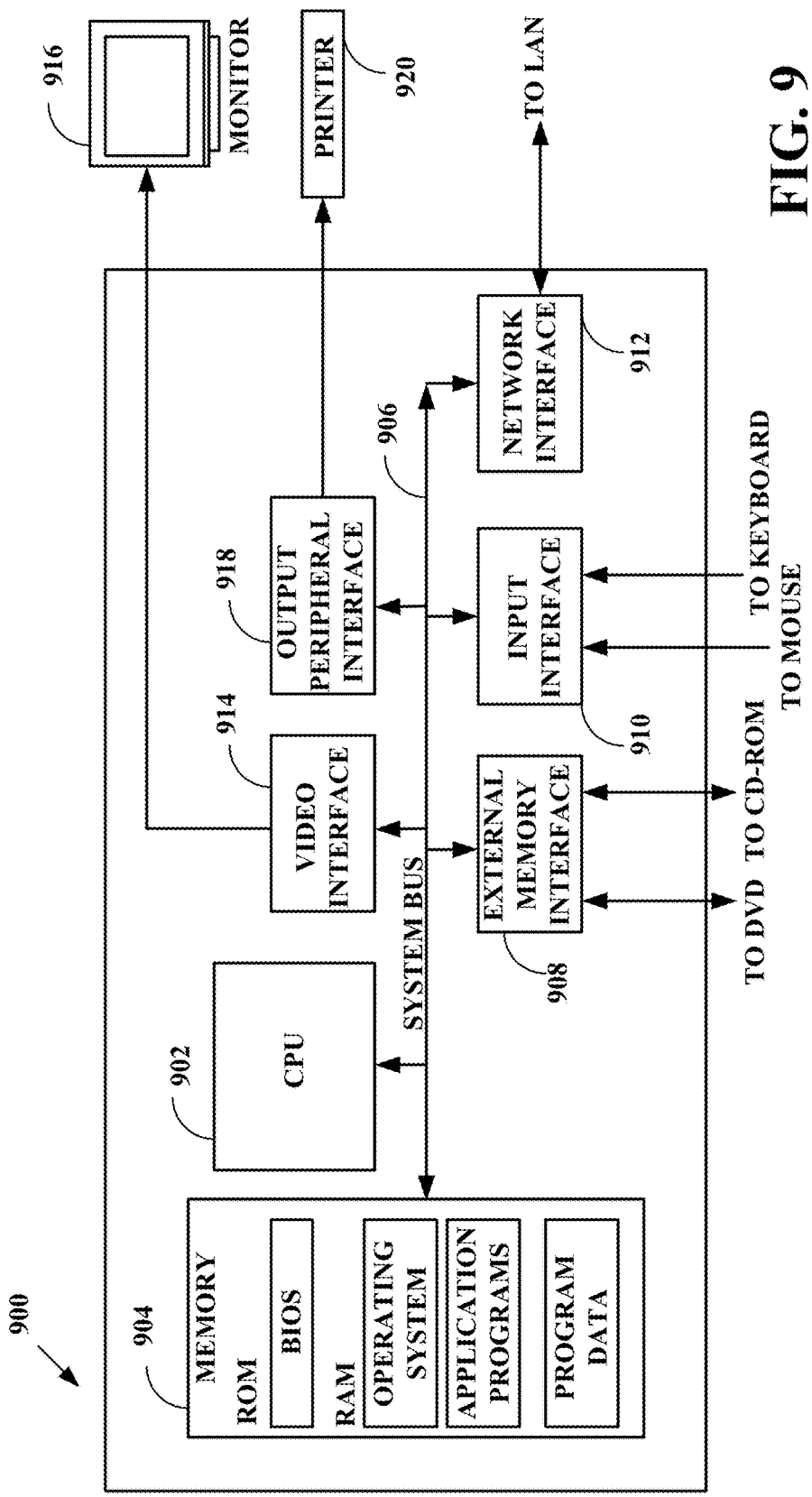
FIG. 9 is a diagram of a computer system, according to an embodiment.

FIG. 9 depicts a computer system comprising the structure for implementation of the embodiments described above. Computer system 900 comprises a central processing unit (CPU) 902 that processes data stored in memory 904 exchanged via system bus 906. Memory 904 typically includes read-only memory, such as a built-in operating system, and random-access memory, which may include an operating system, application programs, and program data. Computer system 900 also comprises an external memory interface 908 to exchange data with a DVD or CD-ROM for example. Further, input interface 910 may serve to receive input from user input devices including but not limited to a keyboard and a mouse. Network interface 912 may allow external data exchange with a local area network (LAN) or other network, including the internet. Computer system 900 also typically comprises a video interface 914 for displaying information to a user via a monitor 916. An output peripheral interface 918 may output computational results and other information to output devices including but not limited to a printer 920.

Computer system 900 may comprise for example a personal computer or an engineering workstation, each of which is widely known in the art and is commonly used for integrated circuit design tasks, along with software products commercially available for performing computer-aided integrated circuit design tasks. Computer system 900 may also comprise a mobile computer, including for example a tablet computer or a smart phone. The computer system of FIG. 9 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention will be apparent to ordinarily skilled artisans. The invention is limited only by the scope of the appended claims.

What is claimed is:

1. A method for modeling a receiver load, comprising:
using a computer, representing the receiver load with a static capacitance in parallel with a current source in a simulated circuit comprising a driver and a receiver, wherein the receiver load includes anomalies caused by at least one physical phenomenon;
characterizing the static capacitance and the current source from a timing library by:
(i) estimating a receiver input waveform slew rate and extracting a corresponding static capacitance value from the timing library;
(ii) simulating a nonlinear circuit voltage response by including the static capacitance value in the circuit;
(iii) computing a linearized dynamic current correction represented by the current source, wherein the linearized dynamic current is caused by the at least one physical phenomenon; and (iv) determining a voltage correction due to the current source and adding the voltage correction to the simulated nonlinear circuit voltage response;

iterating (i) to (iv) until specified simulation convergence criteria are satisfied;

upon determining that the specified simulation convergence criteria are satisfied, outputting the simulation results comprising the nonlinear circuit voltage response; and fabricating the receiver load based on the simulation results.

2. The method of claim 1 further comprising adjusting the nonlinear circuit voltage response by including an interconnect between the driver and the receiver, with the interconnect represented by at least one of an RC network and a look-up table.

3. The method of claim 1 further comprising outputting the characterization results comprising values describing the static capacitance and current source.

4. The method of claim 1 further comprising using a plurality of slew rates from a plurality of different points in the nonlinear circuit voltage response when extracting the static capacitance value from the timing library.

5. The method of claim 1 further comprising using a plurality of slew rates from a plurality of different points in the nonlinear circuit voltage response when extracting a plurality of static capacitance values from the timing library to compute the linearized dynamic current correction.

6. The method of claim 1 further comprising using the modeled receiver load in a static timing analysis for a digital circuit.

7. The method of claim 1 wherein the at least one physical phenomenon includes at least one of resistive gate shielding and back-Miller effect.

8. A non-transitory computer readable medium storing instructions that, when executed by a processor, perform a method for modeling a receiver load, the method comprising:

representing the receiver load with a static capacitance in parallel with a current source in a simulated circuit comprising a driver and a receiver, wherein the receiver load includes anomalies caused by at least one physical phenomenon;

characterizing the static capacitance and the current source from a timing library by:
(i) estimating a receiver input waveform slew rate and extracting a corresponding static capacitance value from the timing library;
(ii) simulating a nonlinear circuit voltage response by including the static capacitance value in the circuit;
(iii) computing a linearized dynamic current correction represented by the current source, wherein the linearized dynamic current is caused by the at least one physical phenomenon; and
(iv) determining a voltage correction due to the current source and adding the voltage correction to the simulated nonlinear circuit voltage response;

iterating (i) to (iv) until specified simulation convergence criteria are satisfied;

upon determining that the specified simulation convergence criteria are satisfied, outputting the simulation results comprising the nonlinear circuit voltage response; and fabricating the receiver load based on the simulation results.

9. The medium of claim 8 further comprising adjusting the nonlinear circuit voltage response by including an interconnect between the driver and the receiver, with the interconnect represented by at least one of an RC network and a look-up table.

10. The medium of claim 8 further comprising instructions for outputting the characterization results comprising values describing the static capacitance and current source.

11. The medium of claim 8 further comprising instructions for using a plurality of slew rates from a plurality of different points in the nonlinear circuit voltage response when extracting the static capacitance value from the timing library.

12. The medium of claim 8 further comprising instructions for using a plurality of slew rates from a plurality of different points in the nonlinear circuit voltage response when extracting a plurality of static capacitance values from the timing library to compute the linearized dynamic current correction.

13. The medium of claim 8 further comprising instructions for using the modeled receiver load in a static timing analysis for a digital circuit.

14. The medium of claim 8 wherein the at least one physical phenomenon includes at least one of resistive gate shielding and back-Miller effect.

15. A system comprising:
a non-transitory memory storing executable instructions; and
a processor executing the instructions to perform a method for modeling a receiver load, the method comprising:
representing the receiver load with a static capacitance in parallel with a current source in a simulated circuit comprising a driver and a receiver, wherein the receiver load includes anomalies caused by at least one physical phenomenon;
characterizing the static capacitance and the current source from a timing library by:
(i) estimating a receiver input waveform slew rate and extracting a corresponding static capacitance value from the timing library;
(ii) simulating a nonlinear circuit voltage response by including the static capacitance value in the circuit;
(iii) computing a linearized dynamic current correction represented by the current source, wherein the linearized dynamic current is caused by the at least one physical phenomenon; and
(iv) determining a voltage correction due to the current source and adding the voltage correction to the simulated nonlinear circuit voltage response;
iterating (i) to (iv) until specified simulation convergence criteria are satisfied;
upon determining that the specified simulation convergence criteria are satisfied, outputting the simulation results comprising the nonlinear circuit voltage response; and
fabricating the receiver load based on the simulation results.

16. The system of claim 15 further comprising instructions for outputting the characterization results comprising values describing the static capacitance and current source.

17. The system of claim 15 further comprising instructions for using a plurality of slew rates from a plurality of different points in the nonlinear circuit voltage response when extracting the static capacitance value from the timing library.

18. The system of claim 15 further comprising instructions for using a plurality of slew rates from a plurality of different points in the nonlinear circuit voltage response when extracting a plurality of static capacitance values from the timing library to compute the linearized dynamic current correction.

19. The system of claim 15 further comprising instructions for using the modeled receiver load in a static timing analysis for a digital circuit.

20. The system of claim 15 wherein the at least one physical phenomenon includes at least one of resistive gate shielding and back-Miller effect.

* * * * *